US011052797B2

(12) United States Patent
Poptani et al.

(10) Patent No.: US 11,052,797 B2
(45) Date of Patent: Jul. 6, 2021

(54) RECLINER HEART FOR SEAT ASSEMBLY

(71) Applicant: FISHER & COMPANY, INCORPORATED, St. Clair Shores, MI (US)

(72) Inventors: Sapan Mahendra Poptani, Northville, MI (US); Anwer Ashab Ansari, St. Clair Shores, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 16/914,569

(22) Filed: Jun. 29, 2020

(65) Prior Publication Data

US 2021/0039528 A1 Feb. 11, 2021

(30) Foreign Application Priority Data

Aug. 9, 2019 (IN) .............................. 201921032346

(51) Int. Cl.
*B60N 2/433* (2006.01)
*B60N 2/235* (2006.01)
*B60N 2/22* (2006.01)

(52) U.S. Cl.
CPC ........... *B60N 2/433* (2013.01); *B60N 2/2245* (2013.01); *B60N 2/2356* (2013.01); *B60N 2/2362* (2015.04)

(58) Field of Classification Search
CPC .... B60N 2/2356; B60N 2/433; B60N 2/2245; B60N 2/236; B60N 2/2362
USPC .......................................... 297/367 P, 216.13
See application file for complete search history.

(56) References Cited

U.S. PATENT DOCUMENTS

| | | | |
|---|---|---|---|
| 3,736,026 | A | 5/1973 | Ziegler et al. |
| 3,953,069 | A | 4/1976 | Tamura et al. |
| 4,219,234 | A | 8/1980 | Bell |
| 4,243,264 | A | 1/1981 | Bell |
| 4,279,442 | A | 7/1981 | Bell |
| 4,372,610 | A | 2/1983 | Fisher, III et al. |
| 4,457,557 | A | 7/1984 | Une |

(Continued)

FOREIGN PATENT DOCUMENTS

| | | |
|---|---|---|
| DE | 4324734 A1 | 1/1995 |
| DE | 102007002366 B3 | 7/2008 |

(Continued)

OTHER PUBLICATIONS

Office Action regarding Canadian Patent Application No. 2,812,408, dated Jun. 17, 2016.

(Continued)

*Primary Examiner* — Milton Nelson, Jr.
(74) *Attorney, Agent, or Firm* — Harness, Dickey & Pierce, P.L.C.

(57) ABSTRACT

A recliner heart includes a housing member, a locking plate and a pawl. The housing member includes a plate surface having a first recess and a second recess. The locking plate includes a surface having teeth formed thereon. The pawl is movable in the first recess between a secure position in which the pawl is engaged with the teeth of the locking plate and a release position in which the pawl is disengaged from the teeth of the locking plate. The pawl includes a boss slidably received in the second recess. A first lateral side of the boss abuts against a sidewall of the second recess upon an impact event.

17 Claims, 12 Drawing Sheets

(56) References Cited

U.S. PATENT DOCUMENTS

| | | |
|---|---|---|
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A * | 12/1999 | Kojima ................. B60N 2/236 297/367 R |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,634,713 B2 * | 10/2003 | Nonomiya ............ B60N 2/236 297/367 R |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,740,845 B2 | 5/2004 | Stol et al. |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 * | 4/2008 | Smuk ................... B60N 2/236 297/367 R |
| 7,419,217 B2 | 9/2008 | Ishizuka |
| 7,458,639 B2 | 12/2008 | Thiel et al. |
| 7,490,907 B2 | 2/2009 | Nagura et al. |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,976,103 B2 | 7/2011 | Gamache et al. |
| 8,052,215 B2 | 11/2011 | Ito |
| 8,360,527 B2 | 1/2013 | Lehmann |
| 9,108,541 B2 | 8/2015 | Assmann et al. |
| 9,227,532 B2 | 1/2016 | Balzar et al. |
| 9,527,419 B2 | 12/2016 | Hosbach et al. |
| 9,555,725 B2 | 1/2017 | Rothstein et al. |
| 9,701,222 B2 | 7/2017 | Kitou |
| 9,751,432 B2 | 9/2017 | Assmann |
| 9,889,774 B2 | 2/2018 | Espinosa et al. |
| 10,279,709 B2 | 5/2019 | Suzuki et al. |
| 10,610,018 B1 | 4/2020 | Madhu |
| 10,800,296 B2 | 10/2020 | Schmitz et al. |
| 10,864,830 B2 | 12/2020 | Schmitz et al. |
| 2003/0127898 A1 | 7/2003 | Niimi et al. |
| 2004/0134055 A1 | 7/2004 | Aizaki |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |
| 2007/0138854 A1 | 6/2007 | Paing et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0056124 A1 | 3/2009 | Krebs et al. |
| 2009/0072602 A1 | 3/2009 | Schuler |
| 2010/0072802 A1 | 3/2010 | Smith et al. |
| 2010/0096896 A1 | 4/2010 | Nonomiya |
| 2010/0231021 A1 | 9/2010 | Myers et al. |
| 2010/0320823 A1 | 12/2010 | Thiel |
| 2011/0068612 A1 | 3/2011 | Thiel |
| 2011/0127814 A1 | 6/2011 | Thiel |
| 2012/0248841 A1 | 10/2012 | Hellrung et al. |
| 2013/0207434 A1 | 8/2013 | Stilleke et al. |
| 2013/0270884 A1 | 10/2013 | Espinosa et al. |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0301682 A1 | 10/2014 | Leppla |
| 2015/0015044 A1 | 1/2015 | Teufel et al. |
| 2015/0069809 A1 | 3/2015 | Matt |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1 | 11/2015 | McCulloch et al. |
| 2016/0339810 A1 | 11/2016 | Pluta et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2018/0056819 A1 | 3/2018 | Schmitz et al. |
| 2018/0103760 A1 | 4/2018 | Fujita et al. |
| 2019/0255979 A1 | 8/2019 | Zahn et al. |
| 2019/0329674 A1 | 10/2019 | Schmitz et al. |
| 2019/0337424 A1 | 11/2019 | Chang |

(56) References Cited

U.S. PATENT DOCUMENTS

| | | |
|---|---|---|
| 2019/0358694 A1 | 11/2019 | Yamakita |
| 2020/0047644 A1 | 2/2020 | Schmitz et al. |
| 2020/0070689 A1 | 3/2020 | Naik et al. |
| 2020/0253380 A1 | 8/2020 | Schmitz et al. |
| 2020/0282879 A1 | 9/2020 | Schmitz et al. |
| 2020/0331367 A1 | 10/2020 | Schmitz et al. |
| 2021/0061139 A1 | 3/2021 | Schmitz et al. |

FOREIGN PATENT DOCUMENTS

| | | |
|---|---|---|
| DE | 102008026176 A1 | 12/2009 |
| DE | 102011108976 A1 | 1/2013 |
| DE | 102012008940 A1 | 11/2013 |
| GB | 1546104 A | 5/1979 |
| JP | 2000084684 A | 3/2000 |
| JP | 5290789 B2 | 9/2013 |
| JP | 5555969 B2 | 7/2014 |
| KR | 100601809 B1 | 7/2006 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | WO-2011069107 A2 | 6/2011 |
| WO | WO-2013167240 A1 | 11/2013 |

OTHER PUBLICATIONS

Office Action regarding German Patent Application No. 102016114406.1, dated Apr. 27, 2020. Translation provided by Witte, Weller & Partner Patentanwälte mbB.

International Search Report regarding International Application No. PCT/US2020/021377, dated Jun. 30, 2020.

Written Opinion of the International Searching Authority regarding International Application No. PCT/US2020/021377, dated Jun. 30, 2020.

U.S. Appl. No. 16/378,950, filed Apr. 9, 2019, Ralph L. Schmitz et al.

U.S. Appl. No. 16/524,325, filed Jul. 29, 2019, Ralph L. Schmitz et al.

U.S. Appl. No. 16/542,369, filed Aug. 16, 2019, Firoz Divan Naik et al.

U.S. Appl. No. 16/740,874, filed Jan. 13, 2020, Ralph L. Schmitz et al.

U.S. Appl. No. 16/811,112, filed Mar. 6, 2020, Ralph L. Schmitz et al.

U.S. Appl. No. 16/842,135, filed Apr. 7, 2020, Ralph L. Schmitz et al.

U.S. Appl. No. 16/996,991, filed Aug. 19, 2020, Ralph L. Schmitz et al.

U.S. Appl. No. 17/181,189, filed Feb. 22, 2021, Ralph L. Schmitz et al.

SPI Lasers UK Ltd., "Opening new possibilities with single mode oscillation welding (CW)." Presented at: Laser World of Photonics China; Shanghai, China (Mar. 2008).

Office Action regarding German Patent Application No. 102019211855.0, dated Feb. 4, 2021. Partial translation provided by Bardehle Pagenberg Partnerschaft mbB.

Office Action regarding German Patent Application No. 102019212517.4, dated Mar. 11, 2021. Partial translation provided by Bardehle Pagenberg Partnerschaft mbB.

Office Action regarding Indian Patent Application No. 201921032346, dated Mar. 18, 2021.

\* cited by examiner

RECLINER HEART FOR SEAT ASSEMBLY

CROSS-REFERENCE TO RELATED APPLICATIONS

This application claims the benefit and priority of Indian Patent Application No. 201921032346, filed Aug. 9, 2019. The entire disclosure of the above application is incorporated herein by reference.

FIELD

The present disclosure relates to a recliner heart for a seat assembly.

BACKGROUND

This section provides background information related to the present disclosure and is not necessarily prior art.

Vehicle seats often include a recliner heart that can rotate a seatback relative to a seat bottom. A hand lever can be rotated to move the recliner heart between a locked position preventing relative rotation between the seatback and the seat bottom and an unlocked position permitting relative rotation between the seatback and the seat bottom. When a conventional recliner heart is in the locked position, tolerances between components of the recliner heart may allow some movement of the seatback relative to the seat bottom. The present disclosure provides a recliner heart that reduces or prevents movement of the seatback relative to the seat bottom when the recliner heart is in the locked position during an impact event.

SUMMARY

This section provides a general summary of the disclosure, and is not a comprehensive disclosure of its full scope or all of its features.

In one form, the present disclosure provides a recliner heart that includes a housing member, a locking plate and a pawl. The housing member includes a plate surface having a first recess and a second recess. The locking plate includes a surface having teeth formed thereon. The pawl is movable in the first recess between a secure position in which the pawl is engaged with the teeth of the locking plate to restrict relative rotation between the housing member and the locking plate and a release position in which the pawl is disengaged from the teeth of the locking plate to allow relative rotation between the housing member and the locking plate. The pawl includes a boss slidably received in the second recess. A first lateral side of the boss abuts against a first sidewall of the second recess upon an impact event.

In some configurations of the recliner heart of the above paragraph, the first lateral side of the boss faces the first sidewall of the second recess.

In some configurations of the recliner heart of any one or more of the above paragraphs, the first lateral side of the boss is adjacent to the first sidewall of the second recess.

In some configurations of the recliner heart of any one or more of the above paragraphs, the boss has a second lateral side that is opposite the first lateral side. The second lateral side is adjacent to a second sidewall of the second recess.

In some configurations of the recliner heart of any one or more of the above paragraphs, the first recess has a first width and the second recess has a second width. The first width is wider than the second width.

In some configurations of the recliner heart of any one or more of the above paragraphs, the housing member includes a plurality of protrusions. The pawl is disposed in the first recess defined between two of the plurality of protrusions.

In some configurations of the recliner heart of any one or more of the above paragraphs, the pawl has a second lateral side that abuts against one of the two of the plurality of protrusions upon the impact event.

In some configurations of the recliner heart of any one or more of the above paragraphs, an actuator hub engaging the pawl and causing the pawl to slide to the secure position.

In some configurations of the recliner heart of any one or more of the above paragraphs, a coil spring engaging the actuator hub and causing the actuator hub to slide the pawl to the secure position.

In some configurations of the recliner heart of any one or more of the above paragraphs, the boss is asymmetrical.

In some configurations of the recliner heart of any one or more of the above paragraphs, the first recess is adjacent to the second recess.

In some configurations of the recliner heart of any one or more of the above paragraphs, the first sidewall and a second sidewall of the second recess are disposed between sidewalls of the first recess.

In some configurations of the recliner heart of any one or more of the above paragraphs, the second recess is offset from the first recess in a direction parallel to an axis about which the housing member and the locking plate are rotational relative to each other.

In another form, the present disclosure provides a recliner heart that includes a housing member, a locking plate and a pawl. The housing member includes a plate surface having a first recess and a second recess. The second recess has opposing first sidewalls. The locking plate includes a surface having teeth formed thereon. The pawl is movable in the first recess between a secure position in which the pawl is engaged with the teeth of the locking plate to restrict relative rotation between the housing member and the locking plate and a release position in which the pawl is disengaged from the teeth of the locking plate to allow relative rotation between the housing member and the locking plate. The pawl includes a boss slidably received in the second recess. The boss includes opposing second lateral sides. One of the opposing second lateral sides abuts against one of the opposing first sidewalls of the corresponding second recess upon an impact event.

In some configurations of the recliner heart of the above paragraph, the one of the opposing second lateral sides faces the one of the opposing first sidewalls.

In some configurations of the recliner heart of any one or more of the above paragraphs, the one of the opposing second lateral sides is adjacent to the one of the opposing first sidewalls.

In some configurations of the recliner heart of any one or more of the above paragraphs, the first recesses have a first width and the second recesses have a second width. The first width is wider than the second width.

In some configurations of the recliner heart of any one or more of the above paragraphs, the housing member includes a plurality of protrusions. The pawl is disposed in the corresponding first recess defined between two of the plurality of protrusions.

In some configurations of the recliner heart of any one or more of the above paragraphs, the pawl includes a pawl portion that the boss extends from. The pawl portion has a third lateral side that abuts against one of the two of the plurality of protrusions upon the impact event.

In some configurations of the recliner heart of any one or more of the above paragraphs, an actuator hub engaging the pawl and causing the pawl to slide to the secure position.

In some configurations of the recliner heart of any one or more of the above paragraphs, a coil spring engaging the actuator hub and causing the actuator hub to slide the pawl to the secure position.

In some configurations of the recliner heart of any one or more of the above paragraphs, the boss is asymmetrical.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
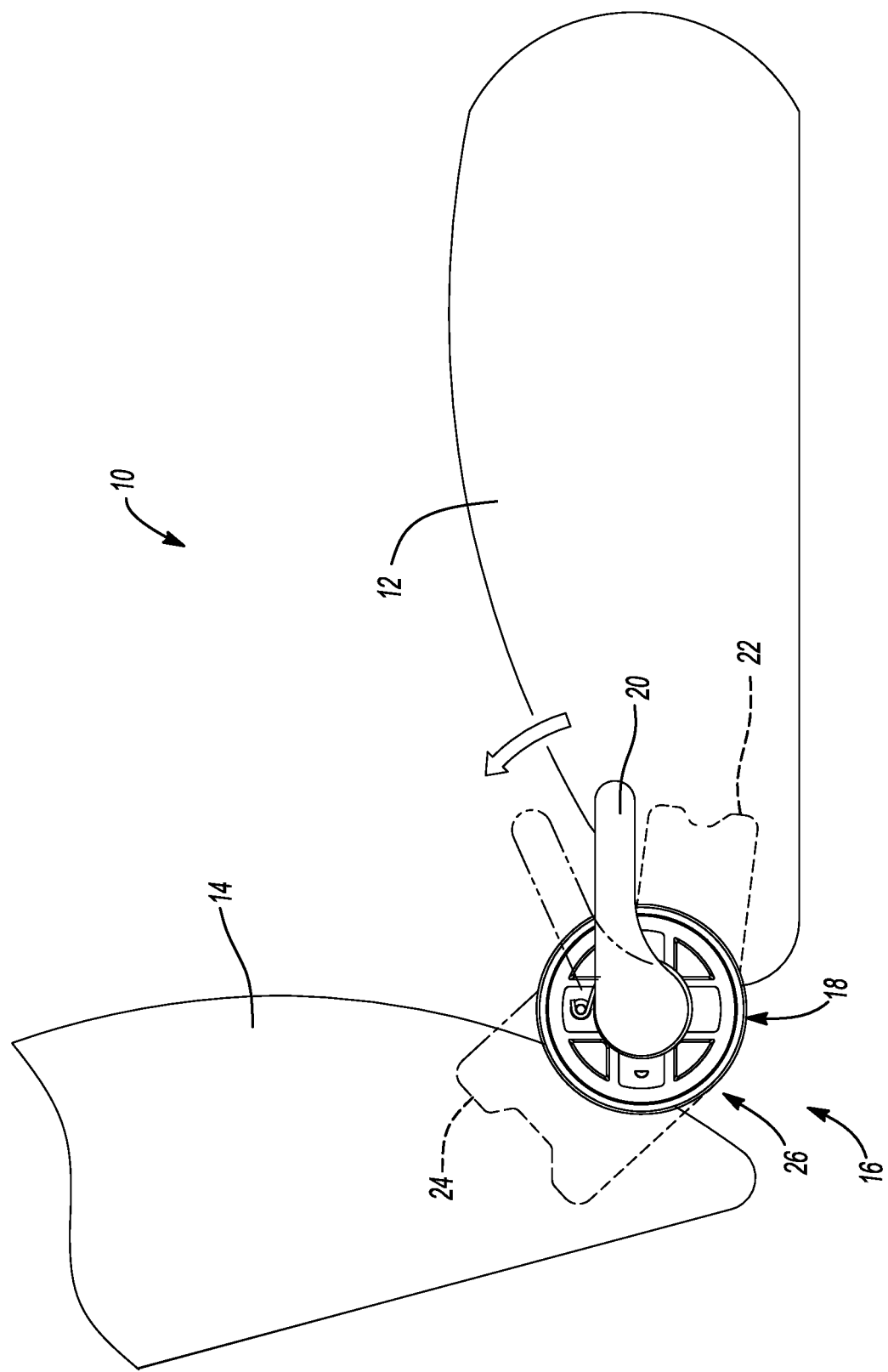
FIG. 1 is a partial side view of a vehicle seat assembly having a recliner mechanism according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle seat assembly 10 is provided that may include a seat bottom 12, a seatback 14 and a seat recliner assembly 16. The seat recliner assembly 16 is connected to the seat bottom 12 and the seatback 14 and can be actuated to allow movement of the seatback 14 relative to the seat bottom 12 among an upright position, a rearward reclined position and a forward dump position. The seat recliner assembly 16 may include a pair of recliner mechanisms 18 (only one of which is shown in FIG. 1), a hand or release lever 20 connected to one of the recliner mechanisms 18 and a cross member (not shown) extending between the recliner mechanisms 18.

Each recliner mechanism 18 may include a first bracket 22, a second bracket 24 and a recliner heart 26. The first and second brackets 22, 24 are mounted to the recliner heart 26. The first bracket 22 may be fixedly mounted to the seat bottom 12 and the second bracket 24 may be fixedly mounted to the seatback 14. The hand lever 20 can be rotated to move the recliner heart 26 between a locked position preventing relative rotation between the seatback 14 and the seat bottom 12 and an unlocked position permitting relative rotation between the seatback 14 and the seat bottom 12 among the upright position, the rearward position and the forward dump position.

Figure 2:
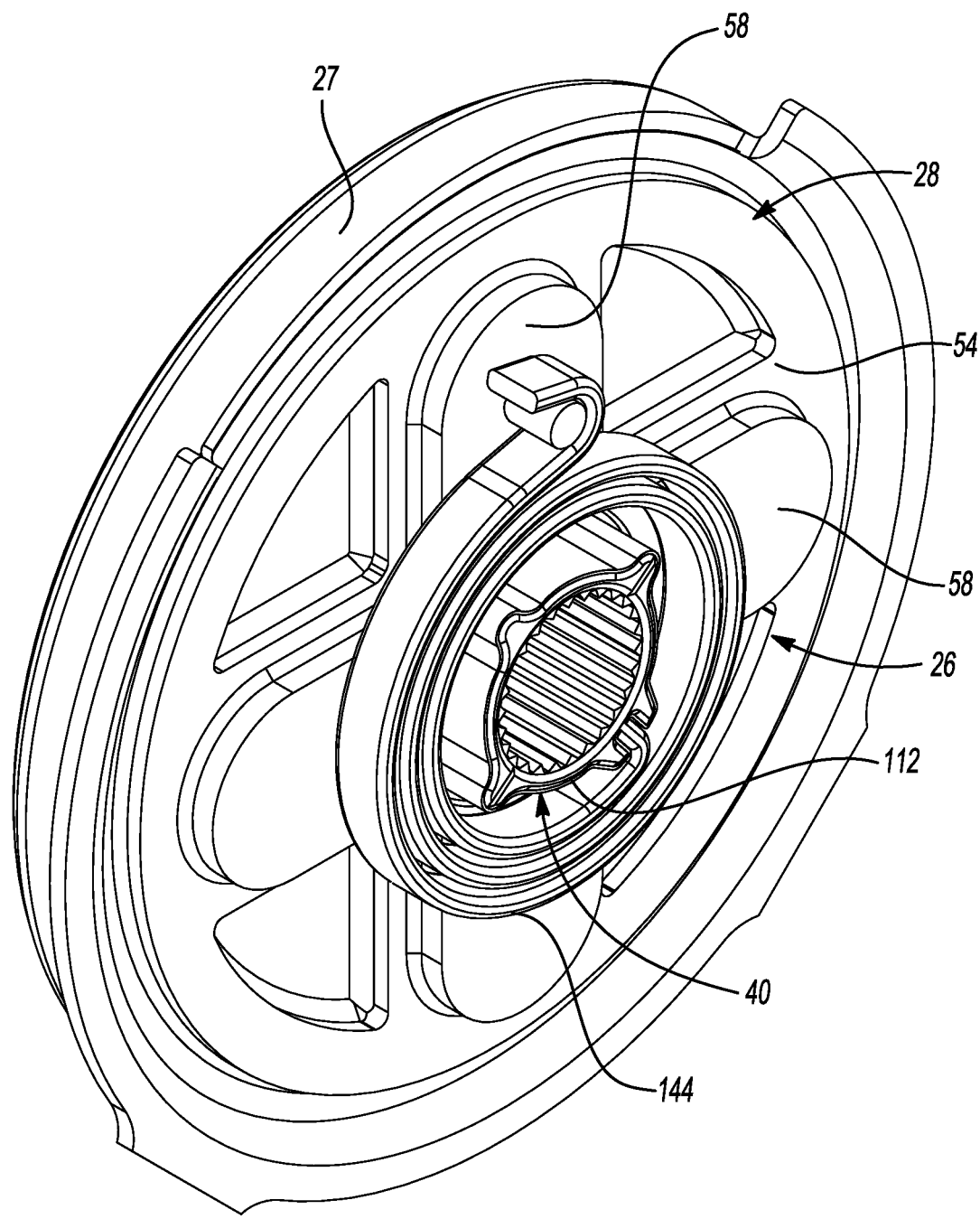
FIG. 2 is a perspective view of a recliner heart of the recliner mechanism of FIG. 1.
Figure 3:
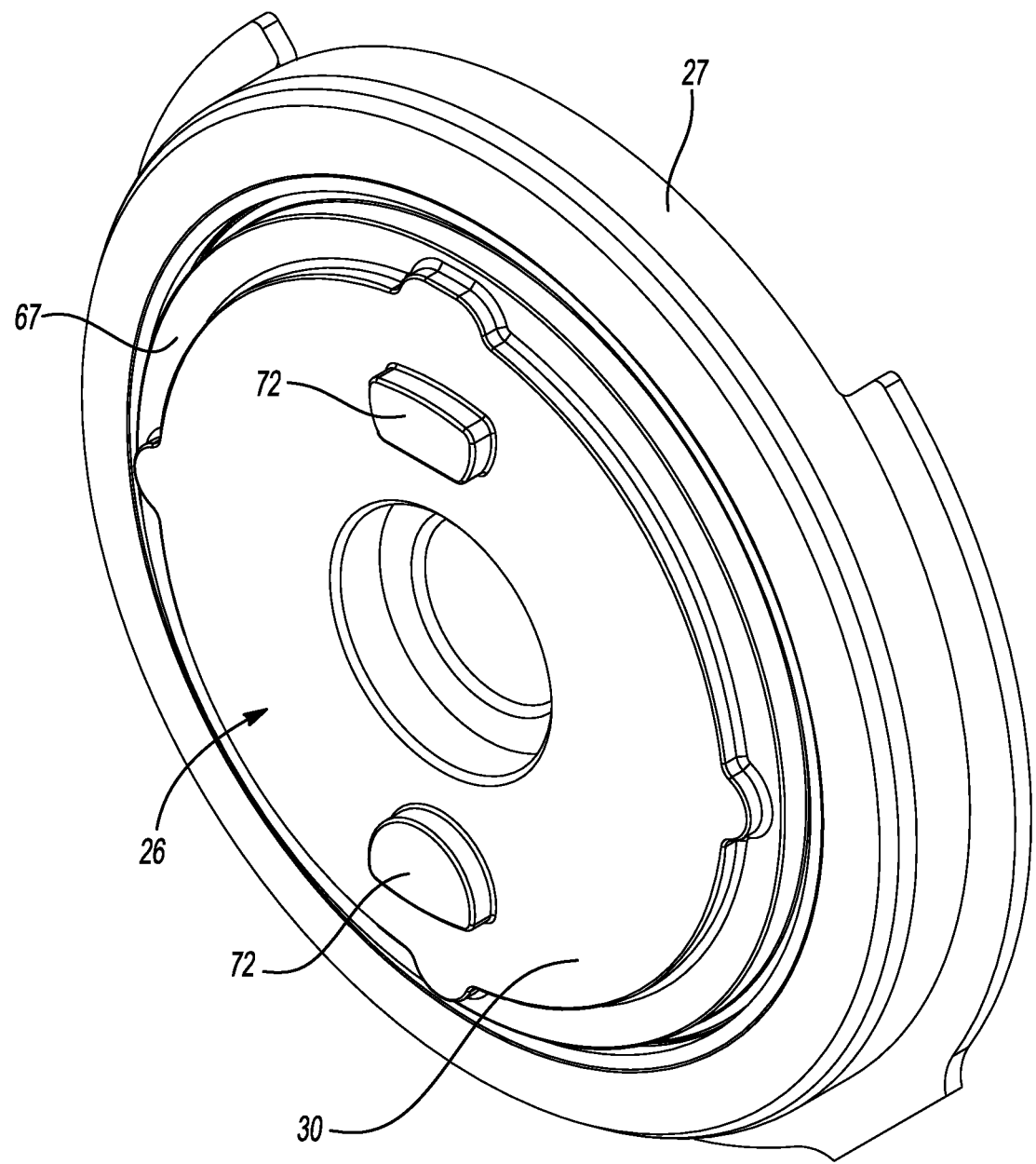
FIG. 3 is another perspective view of the recliner heart.

As shown in FIGS. 2 and 3, an encapsulation ring 27 may be attached (e.g., by welding) to the recliner heart 26 to hold the recliner heart 26 together and also to cover a periphery of the recliner heart 26, thereby preventing debris and fluid from infiltrating the recliner heart 26 and damaging its components. The recliner heart 26 may be a round recliner heart, for example.

Figure 4:
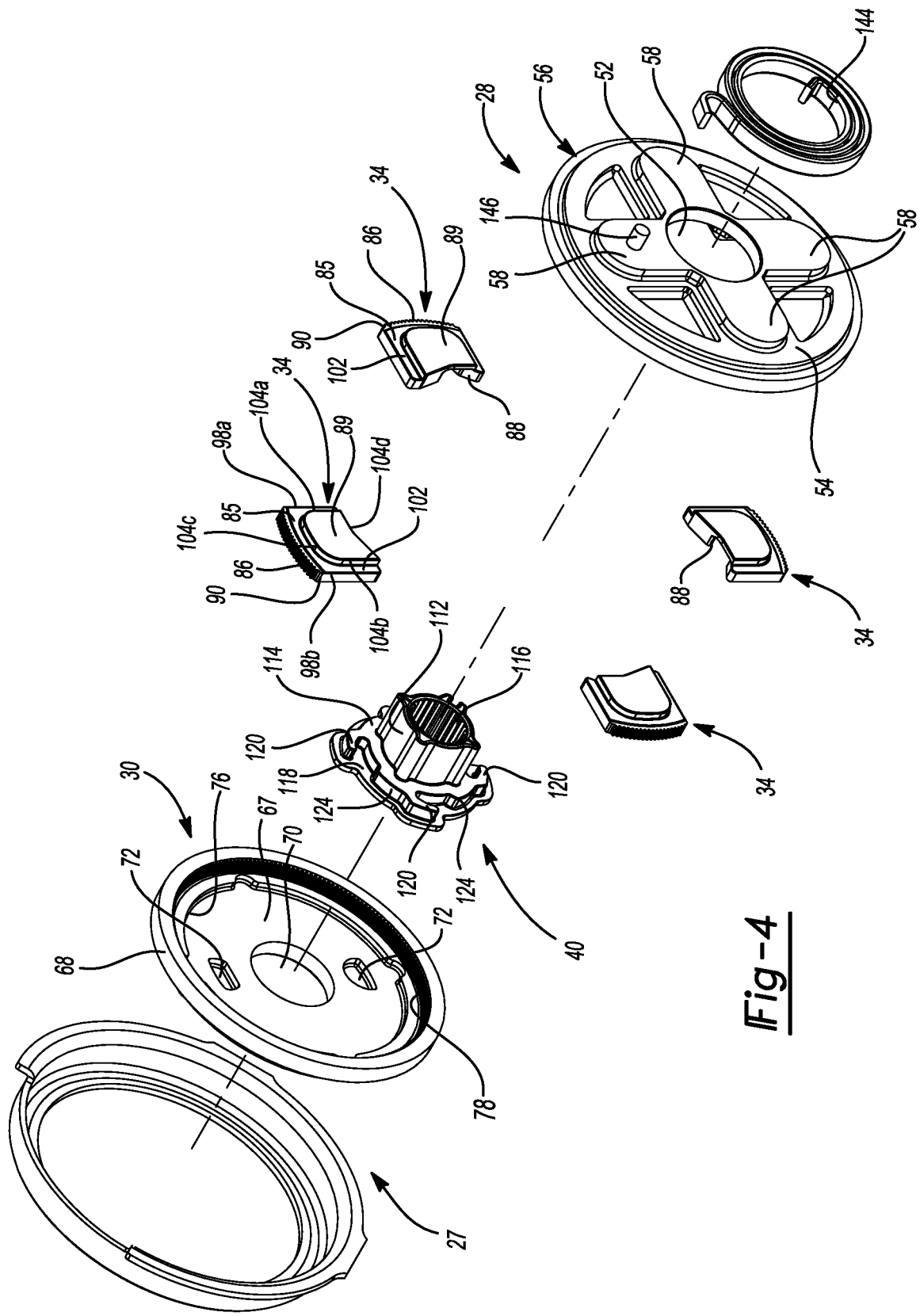
FIG. 4 is an exploded view of the recliner heart.
Figure 5:
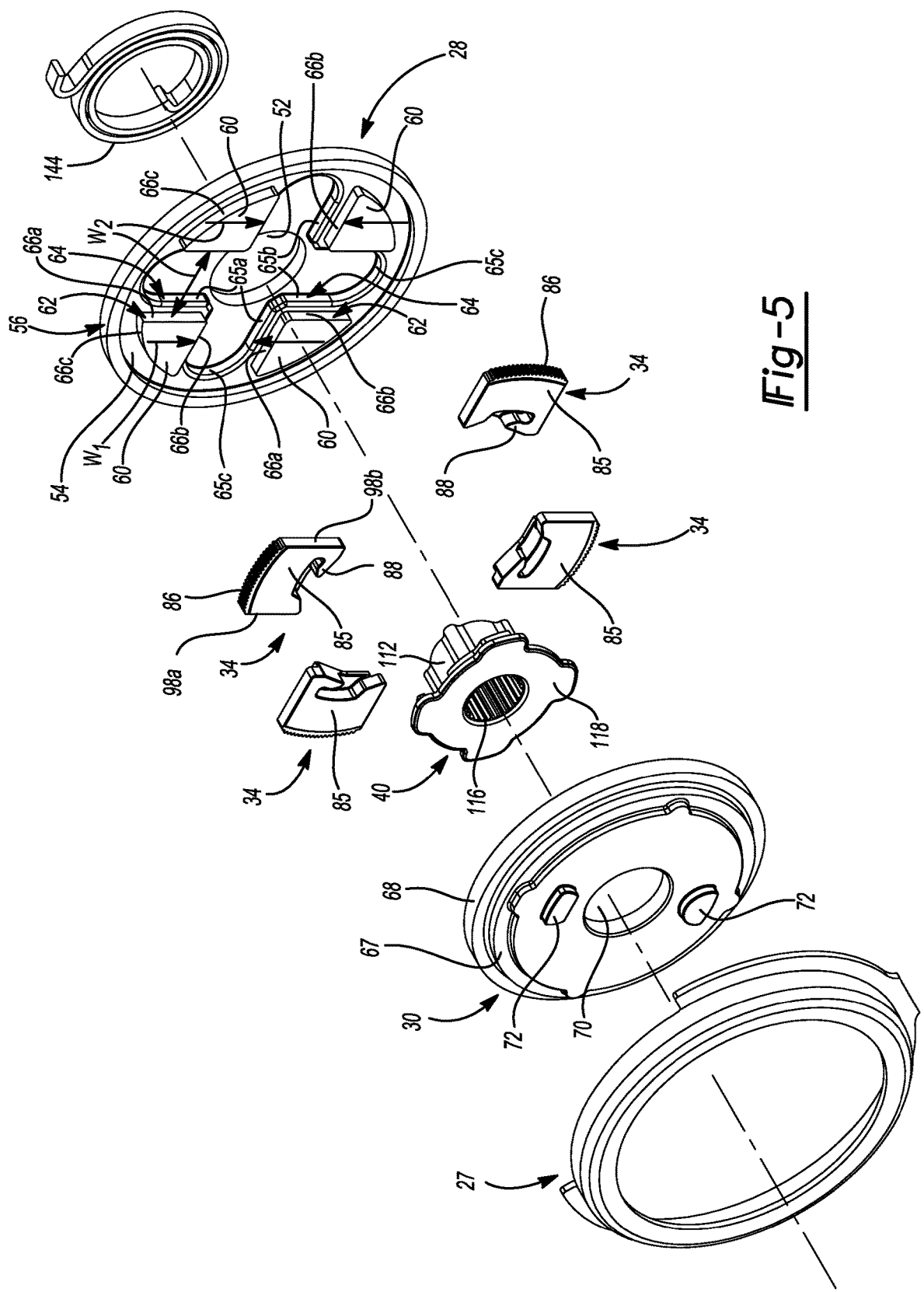
FIG. 5 is another exploded view of the recliner heart.
Figure 6:
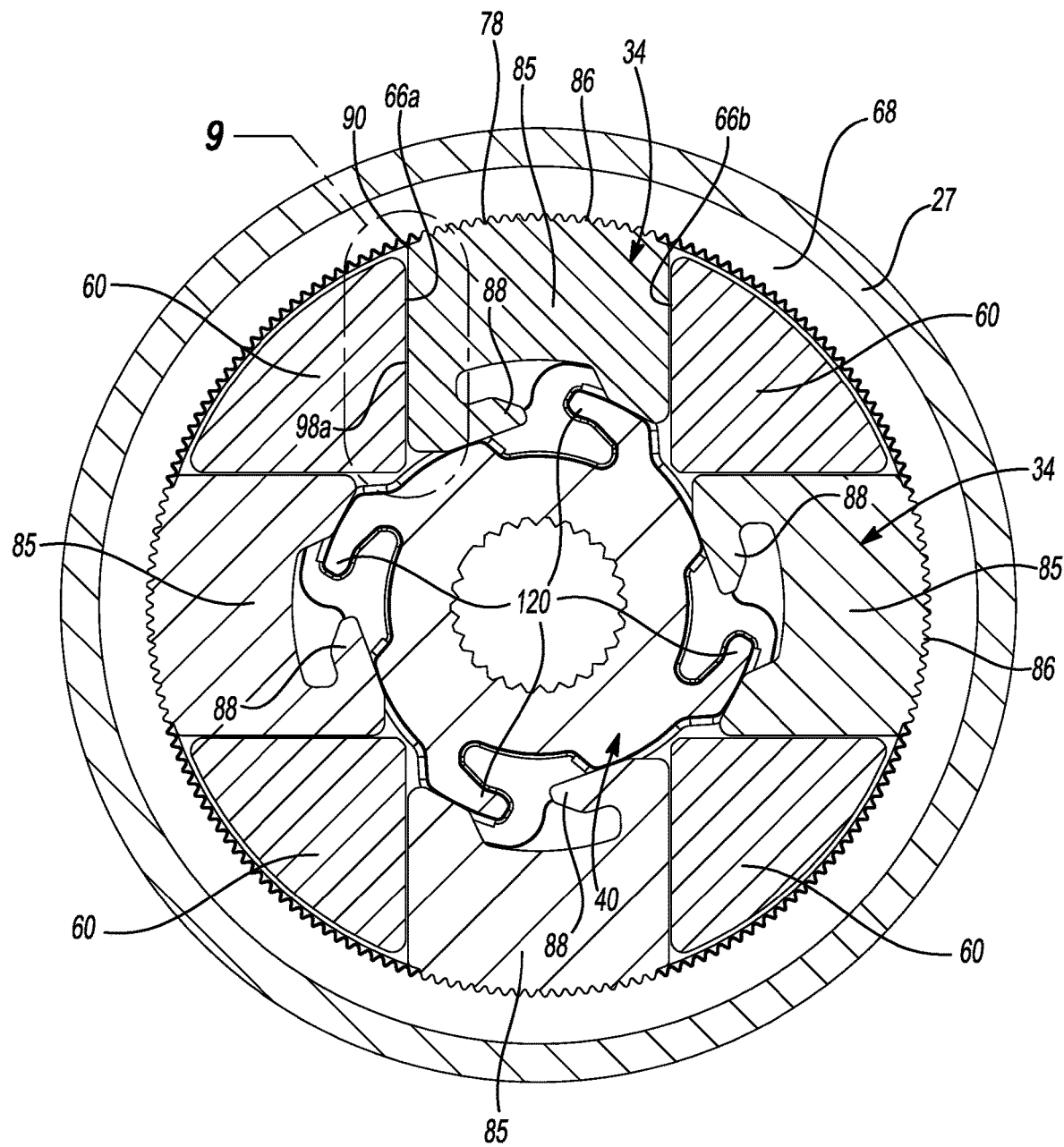
FIG. 6 is a cross-sectional view of the recliner heart in a locked position.

As shown in FIGS. 4 and 5, each recliner heart 26 may include a circular-shaped housing member 28, a circular-shaped locking plate 30, a plurality of pawls 34 and an actuator hub 40.

The housing member 28 and the locking plate 30 may cooperate to define a cavity in which the plurality of pawls 34 are disposed and in which the actuator hub 40 is at least partially disposed. The housing member 28 may be rotationally fixed relative to the seat bottom 12 and may include an aperture 52, a plate surface 54 and a rim 56. As shown in FIGS. 4 and 5, the aperture 52 may extend through a center portion of the plate surface 54. The plate surface 54 may include a plurality of first protrusions 58 (FIG. 4), a plurality of generally triangular-shaped second protrusions 60 (FIG. 5) and first recesses 62 (FIG. 5).

The plurality of first protrusions 58 are disposed radially around the aperture 52 and extend from the plate surface 54, thereby forming second recesses 64 (FIG. 5). Each second recess 64 is disposed between two of the second protrusions 60 and has a first sidewall 65a, a second sidewall 65b, a third sidewall 65c and a first width W1. The second recesses 64 are offset from the first recesses 62 in a direction parallel to an axis about which the housing member 28 and the locking plate 30 are rotational relative to each other. The plurality of second protrusions 60 extend from the plate surface 54 opposite the direction of the plurality of first protrusions 58 and have a first sidewall 66a, a second sidewall 66b and a third sidewall 66c. The sidewalls 66a, 66b are disposed between sidewalls 65a, 65b.

Each first recess 62 is disposed between two of the second protrusions 60 and is adjacent to a corresponding second recess 64. The first recess 62 has a second width W2 which is wider than the width W1 of the corresponding second recess 64. As shown in FIGS. 4 and 5, the rim 56 may extend 360 degrees around the periphery of the plate surface 54.

The locking plate 30 may be rotationally fixed to the seatback 14 and may include a plate surface 67 and a rim 68. The plate surface 67 may include an aperture 70 extending through a center portion thereof and a plurality of projections 72 extending from the plate surface 67 opposite the direction of the rim 68. The plurality of projections 72 may be received in corresponding apertures (not shown) of the second bracket 24 once the recliner heart 26 is mounted to the second bracket 24.

As shown in FIG. 4, the rim 68 may extend 360 degrees around a periphery of the plate surface 67 and may include an inner surface having a lobe 76 and teeth 78. The lobe 76 may extend radially inward from the inner surface of the rim 68 and may extend 360 degrees around the aperture 70. The teeth 78 may be adjacent to the lobe 76 and extend 360 degrees around and the inner surface of the rim 68.

With reference to FIGS. 4-12, each pawl 34 may be slidably received in a corresponding first recess 62 of the plate surface 54 between a secure position (FIGS. 6 and 9) in which the pawl 34 is engaged with a portion of the teeth 78 of the locking plate 30 and a release position (FIG. 8) in which the pawl 34 is disengaged from the portion of the teeth 78 of the locking plate 30. Each pawl 34 may include a pawl portion 85 and a boss 89. The pawl portion 85 may include teeth 86 (FIGS. 4-6, 8 and 9) and a latch 88 (FIGS. 4-6 and 9). The teeth 86 may be disposed at an edge 90 of the pawl 34 and may be adapted for meshing engagement with a portion of the teeth 78 of the locking plate 30 when the pawl 34 is in the secure position. The edge 90 may include a generally arcuate shape to improve engagement between the pawl 34 and the portion of the teeth 78 of the locking plate 30. The pawl portion 85 may also have opposing lateral sides 98a, 98b. The lateral side 98a may face the first sidewall 66a of one second protrusion 60 and the lateral side 98b may face the second sidewall 66b of another second protrusion 60.

Figure 7:
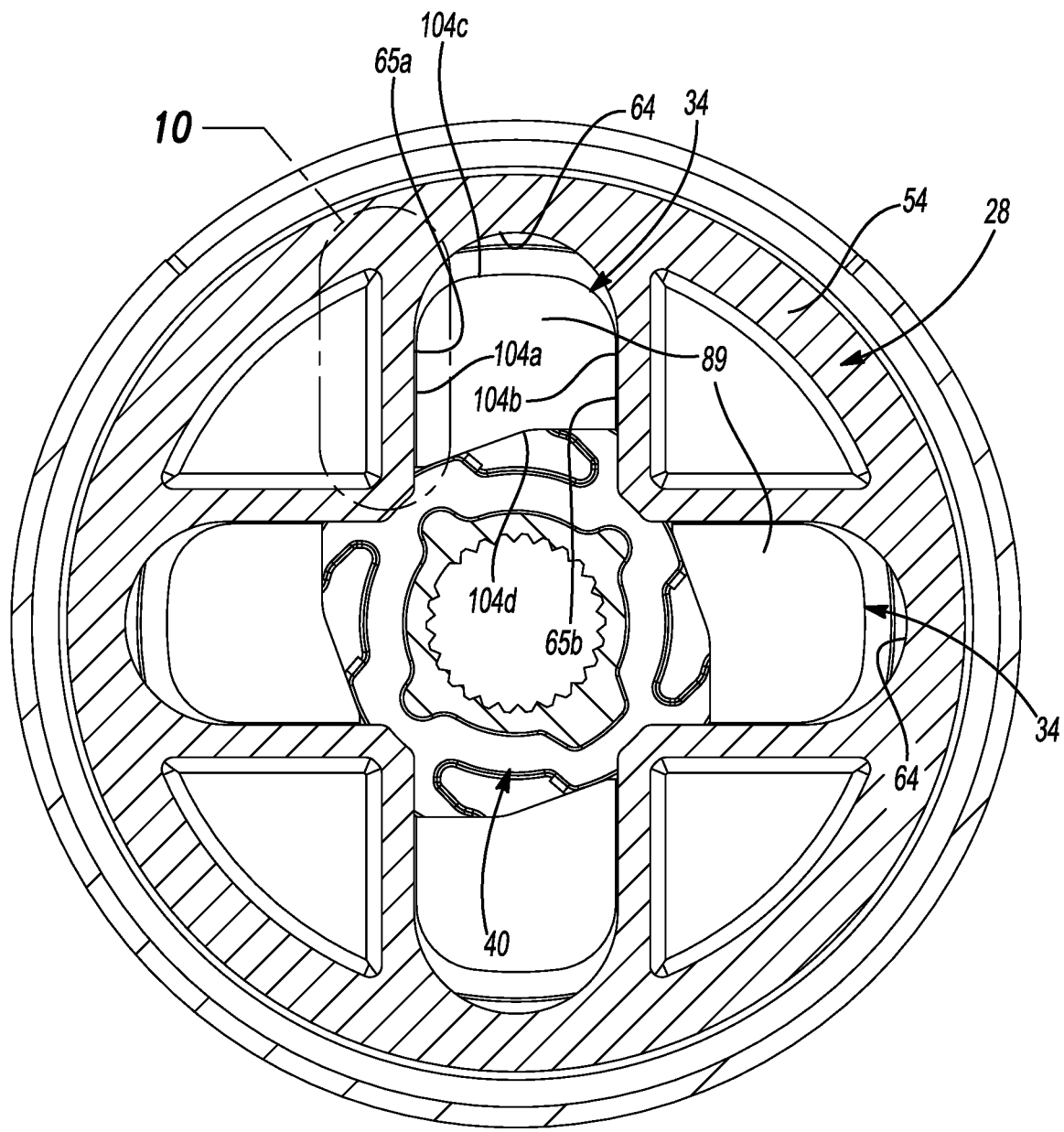
FIG. 7 is another cross-sectional view of the recliner heart in the locked position.
Figure 8:
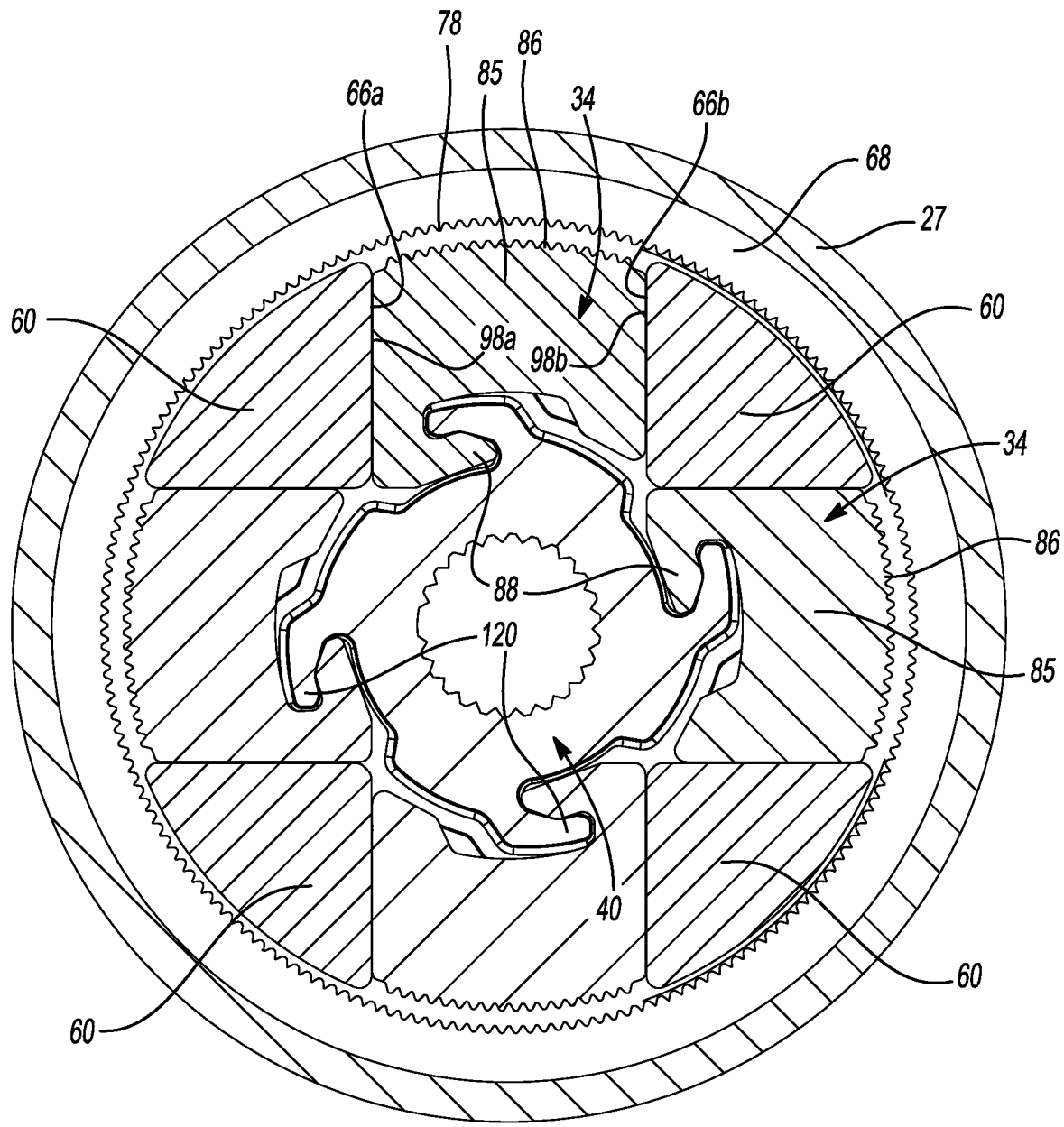
FIG. 8 is a cross-sectional view of the recliner heart in an unlocked position.
Figure 9:
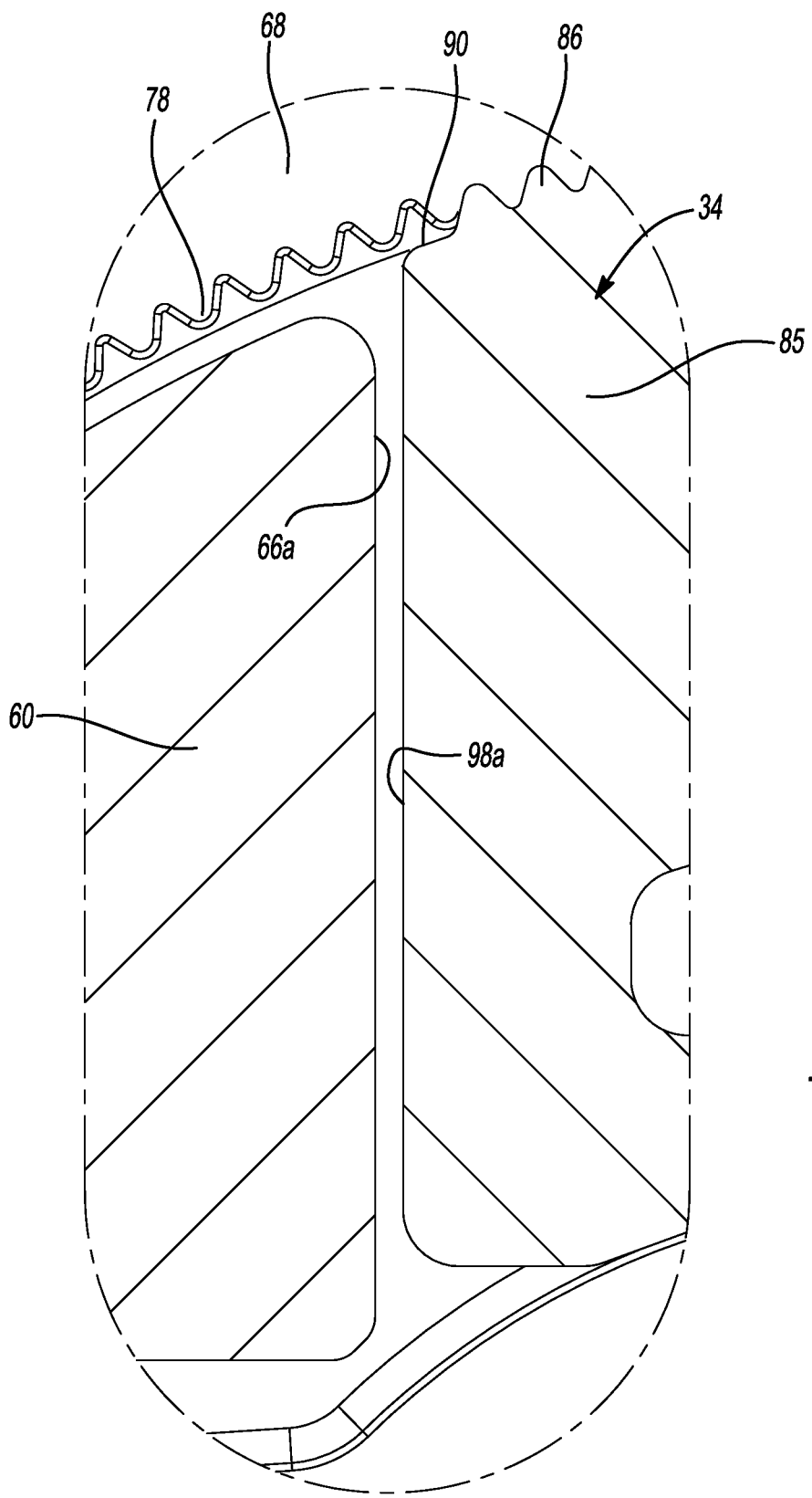
FIG. 9 is a close-up view of a portion of the recliner heart indicated as area 9 shown in FIG. 6.
Figure 10:
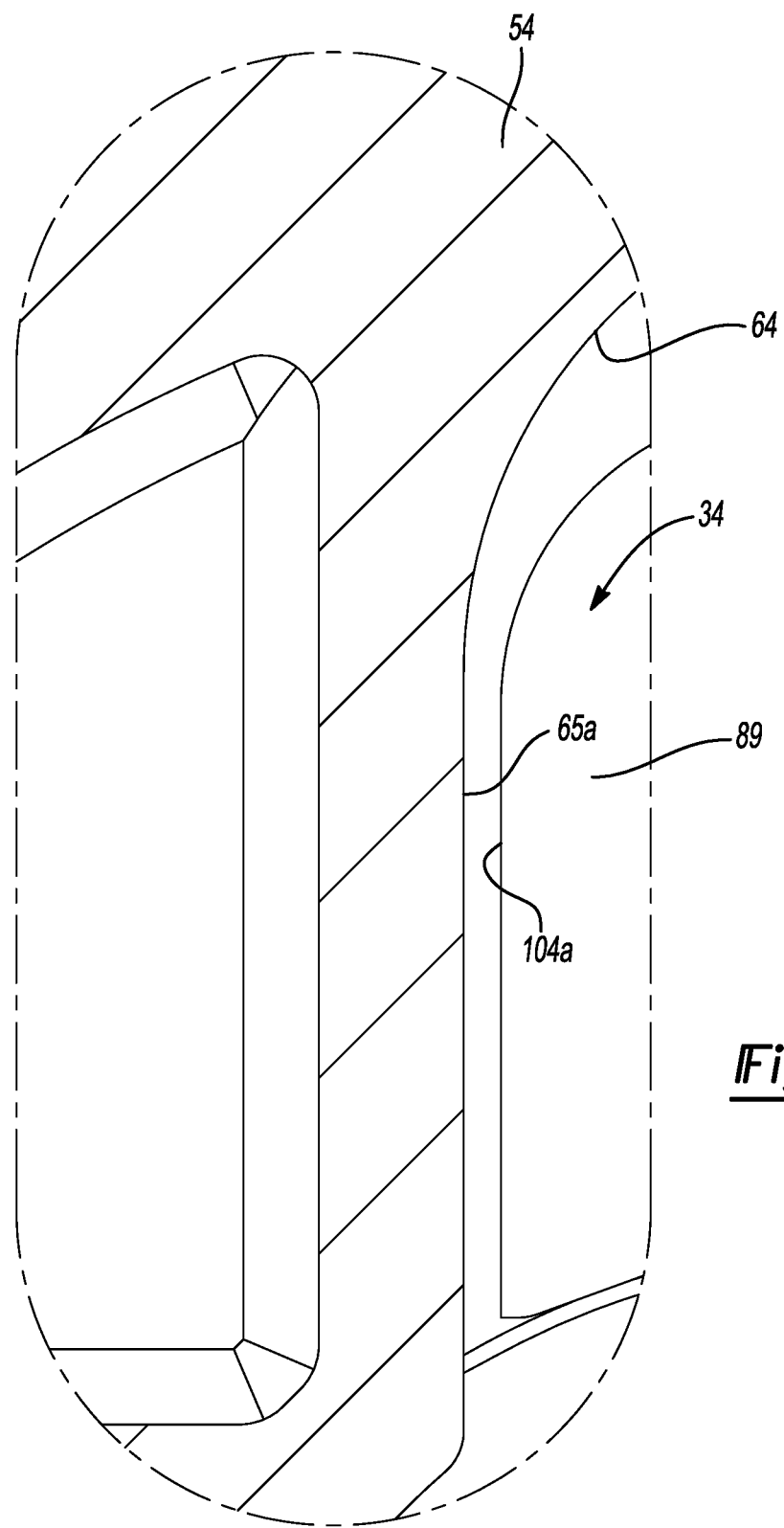
FIG. 10 is a close-up view of a portion of the recliner heart indicated as area 10 shown in FIG. 7.
Figure 11:
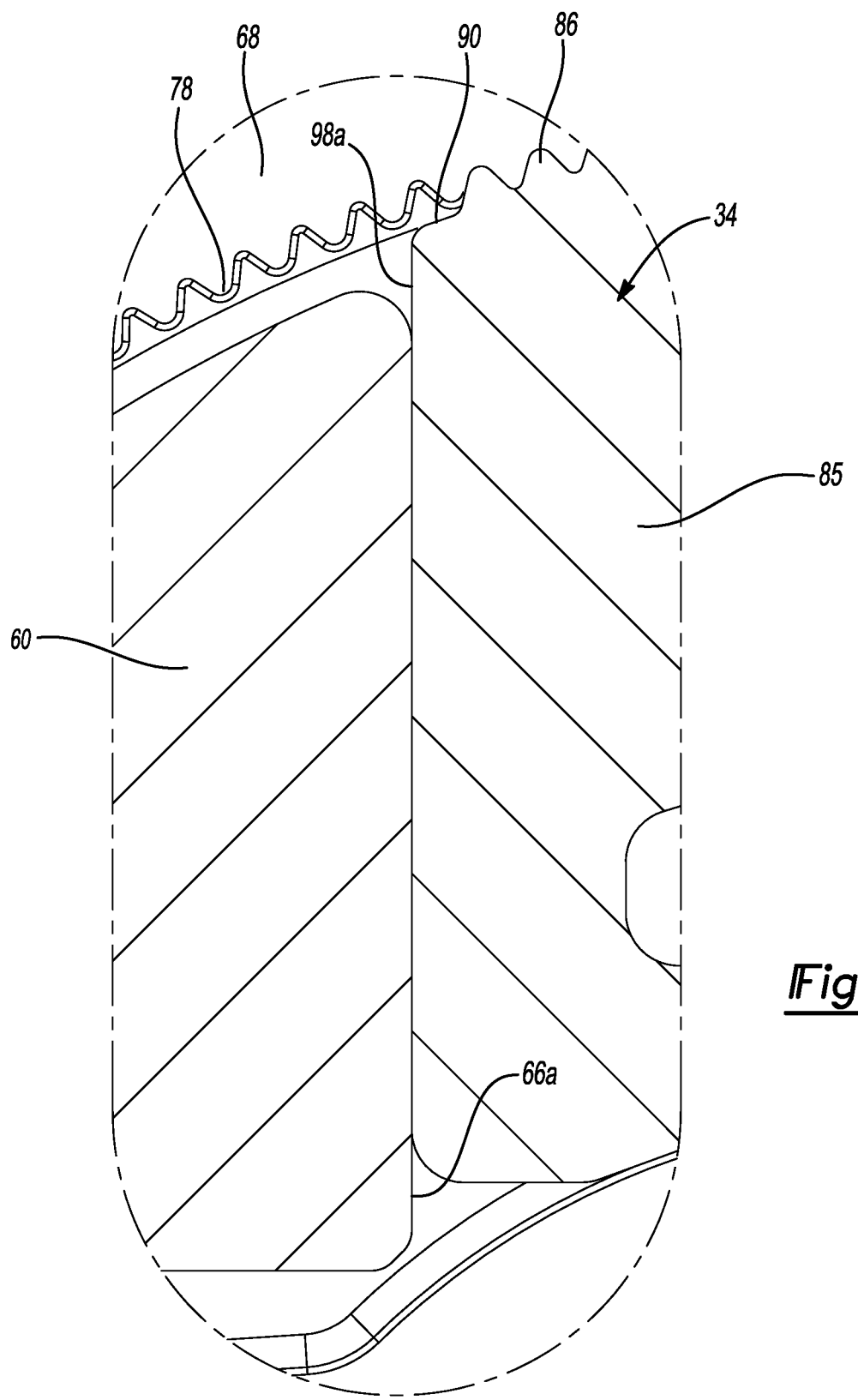
FIG. 11 is a close-up view of the portion of the recliner heart shown in FIG. 9 after a vehicle impact event.

The boss 89 may extend from a surface 102 of the pawl portion 85 and may be slidably received in a corresponding second recess 64 of the plurality of first protrusions 58. As shown in FIGS. 4 and 7, the boss 89 may be asymmetrical and may include a plurality of sides (comprising of a first lateral side 104a, a second lateral side 104b, a third curved side 104c and an angled fourth side 104d). The first lateral side 104a and the second lateral side 104b extend parallel to each other and to the lateral sides 98a, 98b. The lateral sides 104a, 104b may also be disposed between the lateral sides 98a, 98b. The first lateral side 104a may face the first sidewall 65a of the second recess 64 and the second lateral side 104b may face the second sidewall 65b of the second recess 64. The first lateral side 104a may also be adjacent to the first sidewall 65a of the second recess 64 and the second lateral side 104b may be adjacent to the second sidewall 65b of the second recess 64.

The actuator hub 40 may include a shaft portion 112, a bushing portion 114, an opening 116 and a generally round disk portion 118. The shaft portion 112 may engage the hand lever 20 such that rotation of the hand lever 20 causes corresponding rotation of the actuator hub 40. The bushing portion 114 may include a plurality of radial latches 120 and a plurality of cam lobes 124. The radial latches 120 may selectively engage the latches 88 of the pawls 34 to move the pawls 34 into the release position. The opening 116 may extend through the shaft portion 112, the bushing portion 114 and the disk portion 118.

A coil spring 144 may be attached to the shaft portion 112 of the actuator hub 40 and a projection 146 extending from the housing member 28, and may rotationally bias the hand lever 20 toward the locked position. The coil spring 144 may also engage the shaft portion 112 such that the actuator hub 40 is rotationally biased in a manner that causes the cam lobes 124 to force the pawls 34 outwardly to the secure position.

Figure 12:
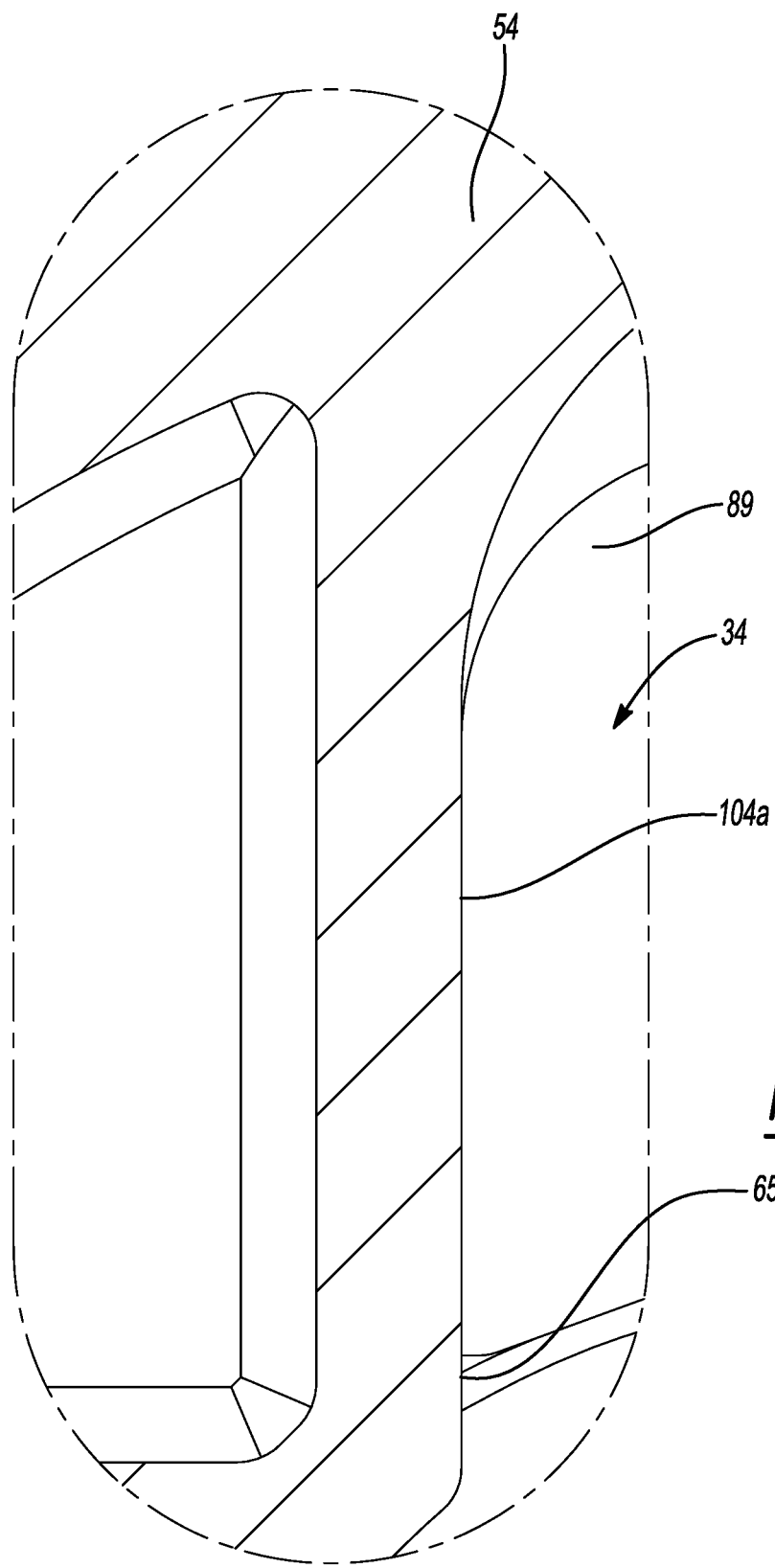
FIG. 12 is a close-up view of the portion of the recliner heart shown in FIG. 10 after the vehicle impact event.

With continued reference to FIGS. 1-12, operation of the recliner assembly 16 will be described in detail. During a vehicle impact event (e.g., a vehicle accident), momentum may exert a force on the seatback 14 in a forward or rearward rotational direction relative to the seat bottom 12, which causes one of the lateral sides 98a, 98b of the pawl portion 85 to abut against one of the adjacent lateral sidewalls 66a, 66b of one second protrusion 60 (FIG. 11) and one of the lateral sides 104a, 104b of the boss 89 to abut against one of the adjacent sidewalls 65a, 65b of the second recess 64 (FIG. 12). In this way, the pawls 34 remain in the first and second recesses 62, 64 during the impact event and maintain engagement with the locking plate 30 (i.e., teeth 94 of the pawls 34 maintain engagement with the teeth 78 of the locking plate 30).

The structure of the pawls 34 provides the benefit of improving retention of the pawls 34 in the first and second recesses 62, 64 during an impact event. That is, the boss 89 of the pawls 34 abutting against one of the sidewalls 65a, 65b of the second recess 64 during a vehicle impact event in addition to the pawl portion 85 of the pawls 34 abutting against one of the second protrusions 60 retains the pawls 34 in the first and second recesses 62, 64.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner heart comprising:
   a housing member including a plate surface having a first recess and a second recess;
   a locking plate including a surface having teeth formed thereon; and
   a pawl movable in the first recess between a secure position in which the pawl is engaged with the teeth of the locking plate to restrict relative rotation between the housing member and the locking plate and a release position in which the pawl is disengaged from the teeth of the locking plate to allow relative rotation between the housing member and the locking plate,
   wherein the pawl includes a boss slidably received in the second recess,
   wherein a first lateral side of the boss abuts against a first sidewall of the second recess upon an impact event,
   wherein the first and second recesses are offset from each other in a direction parallel to an axis about which the housing member and the locking plate are rotatable relative to each other, and
   wherein the boss is asymmetrical.

2. The recliner heart of claim 1, wherein the first lateral side of the boss faces the first sidewall of the second recess.

3. The recliner heart of claim 1, wherein the first lateral side of the boss is adjacent to the first sidewall of the second recess.

4. The recliner heart of claim 3, wherein the boss has a second lateral side that is opposite the first lateral side, and wherein the second lateral side is adjacent to a second sidewall of the second recess.

5. The recliner heart of claim 1, wherein the first recess has a first width and the second recess has a second width, and wherein the first width is wider than the second width.

6. The recliner heart of claim 1, wherein the housing member includes a plurality of protrusions, and wherein the pawl is disposed in the first recess defined between two of the plurality of protrusions.

7. The recliner heart of claim 6, wherein the pawl includes a pawl portion that the boss extends from, and wherein the pawl portion has a second lateral side that abuts against one of the two of the plurality of protrusions upon the impact event.

8. The recliner heart of claim 7, further comprising an actuator hub engaging the pawl and causing the pawl to slide to the secure position.

9. The recliner heart of claim 8, further comprising a coil spring engaging the actuator hub and causing the actuator hub to slide the pawl to the secure position.

10. The recliner heart of claim 1, wherein the first recess is adjacent to the second recess.

11. The recliner heart of claim 10, wherein the first sidewall and an opposing second sidewall of the second recess are disposed between sidewalls of the first recess.

12. A recliner heart comprising:
    a housing member including a plate surface having a first recess and a second recess, the second recess having opposing first sidewalls;
    a locking plate including a surface having teeth formed thereon; and
    a pawl movable in the first recess between a secure position in which the pawl is engaged with the teeth of the locking plate to restrict relative rotation between the housing member and the locking plate and a release position in which the pawl is disengaged from the teeth of the locking plate to allow relative rotation between the housing member and the locking plate,
    wherein the pawl includes a boss slidably received in the second recess,
    wherein the boss includes opposing second lateral sides, and wherein one of the opposing second lateral sides abuts against one of the opposing first sidewalls of the second recess upon an impact event,
    wherein the first and second recesses are offset from each other in a direction parallel to an axis about which the housing member and the locking plate are rotatable relative to each other, and
    wherein the boss is asymmetrical.

13. The recliner heart of claim 12, wherein the housing member includes a plurality of protrusions, and wherein the pawl is disposed in the first recess defined between two of the plurality of protrusions.

14. The recliner heart of claim 13, wherein the pawl includes a pawl portion that the boss extends from, and wherein the pawl portion has a third lateral side that abuts against one of the two of the plurality of protrusions upon the impact event.

15. The recliner heart of claim 12, wherein the one of the opposing second lateral sides faces the one of the opposing first sidewalls.

16. The recliner heart of claim 12, wherein the one of the opposing second lateral sides is adjacent to the one of the opposing first sidewalls.

17. The recliner heart of claim 12, wherein the first recess has a first width and the second recess has a second width, and wherein the first width is wider than the second width.

* * * * *